April 13, 1965   N. M. ROBINSON   3,178,053
PALLET FEEDING APPARATUS
Filed Nov. 13, 1962   5 Sheets-Sheet 4
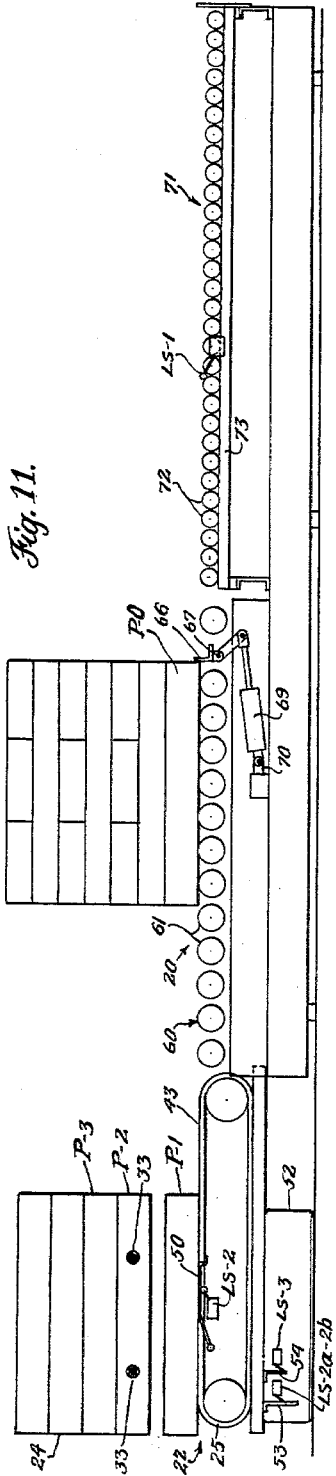
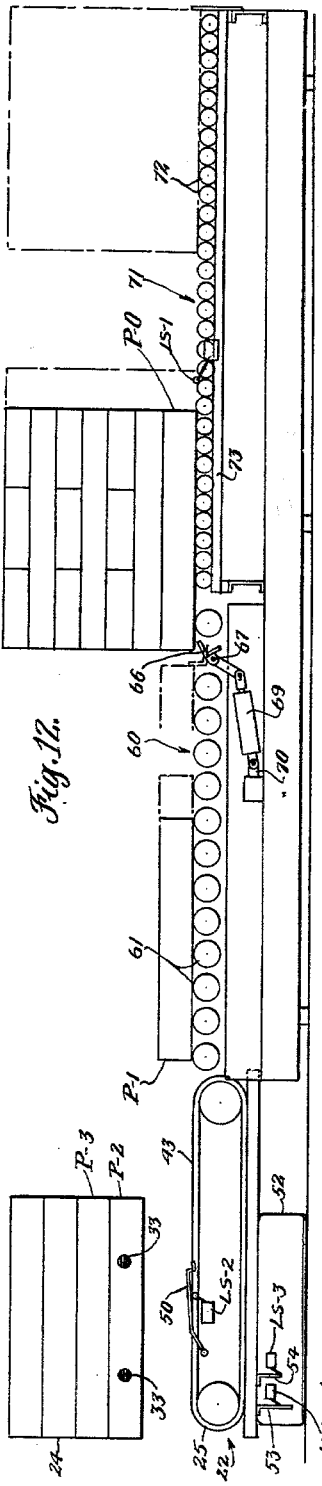
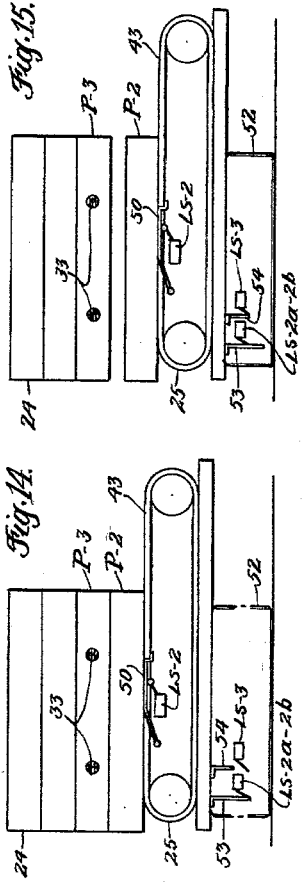
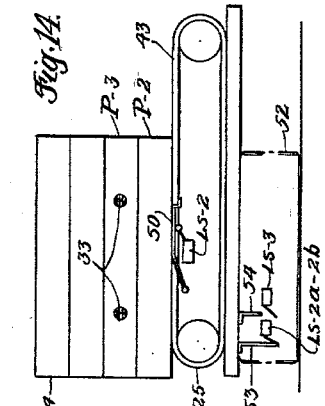
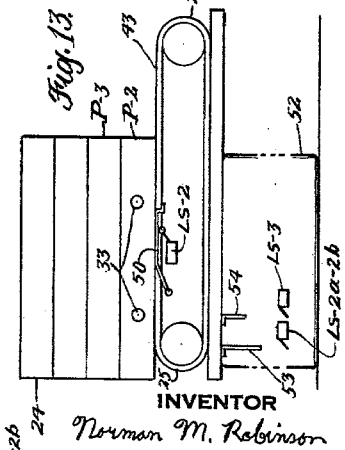
INVENTOR
Norman M. Robinson
BY
Synnestvedt & Lechner
ATTORNEYS April 13, 1965  N. M. ROBINSON  3,178,053
PALLET FEEDING APPARATUS
Filed Nov. 13, 1962  5 Sheets-Sheet 5

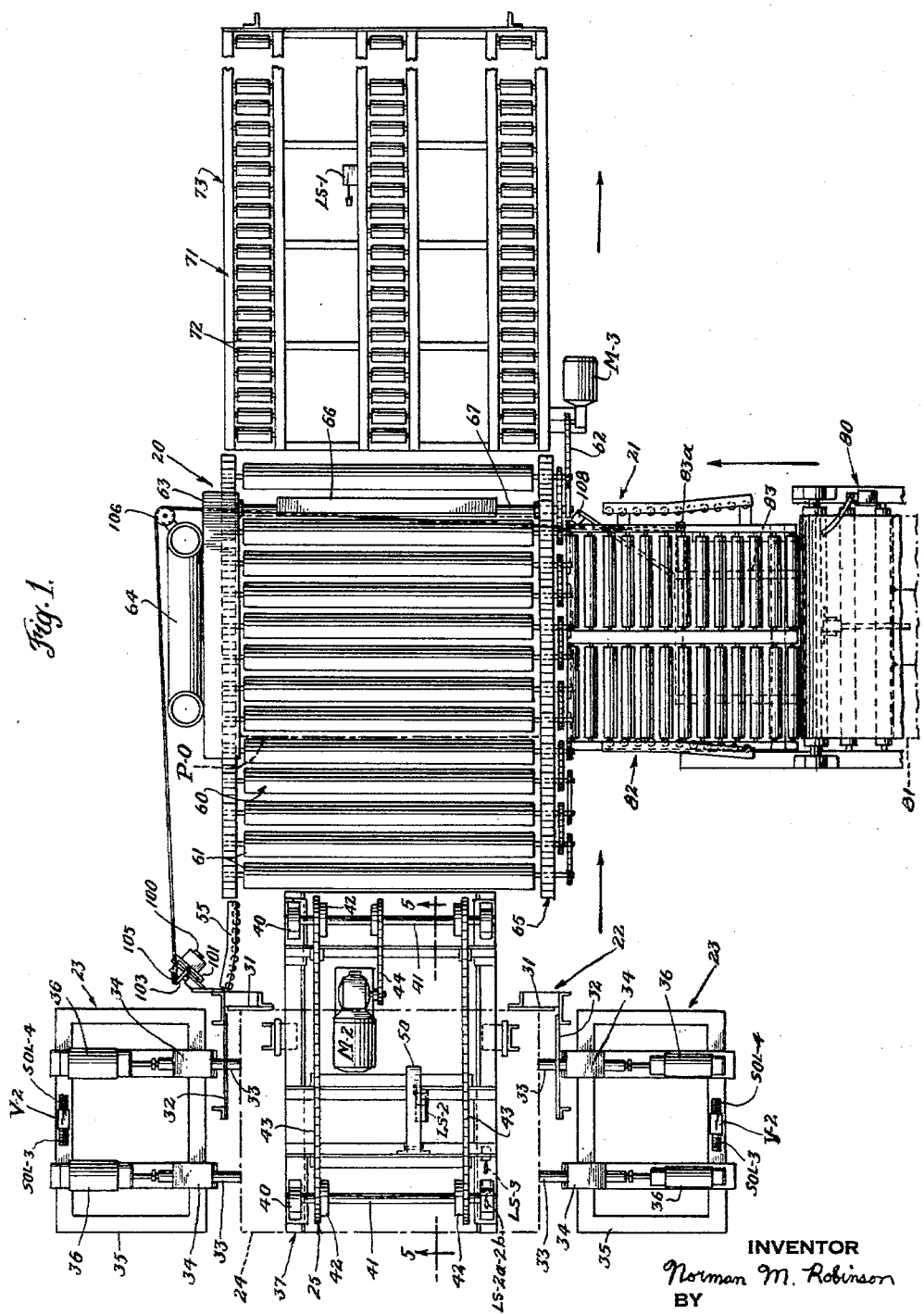

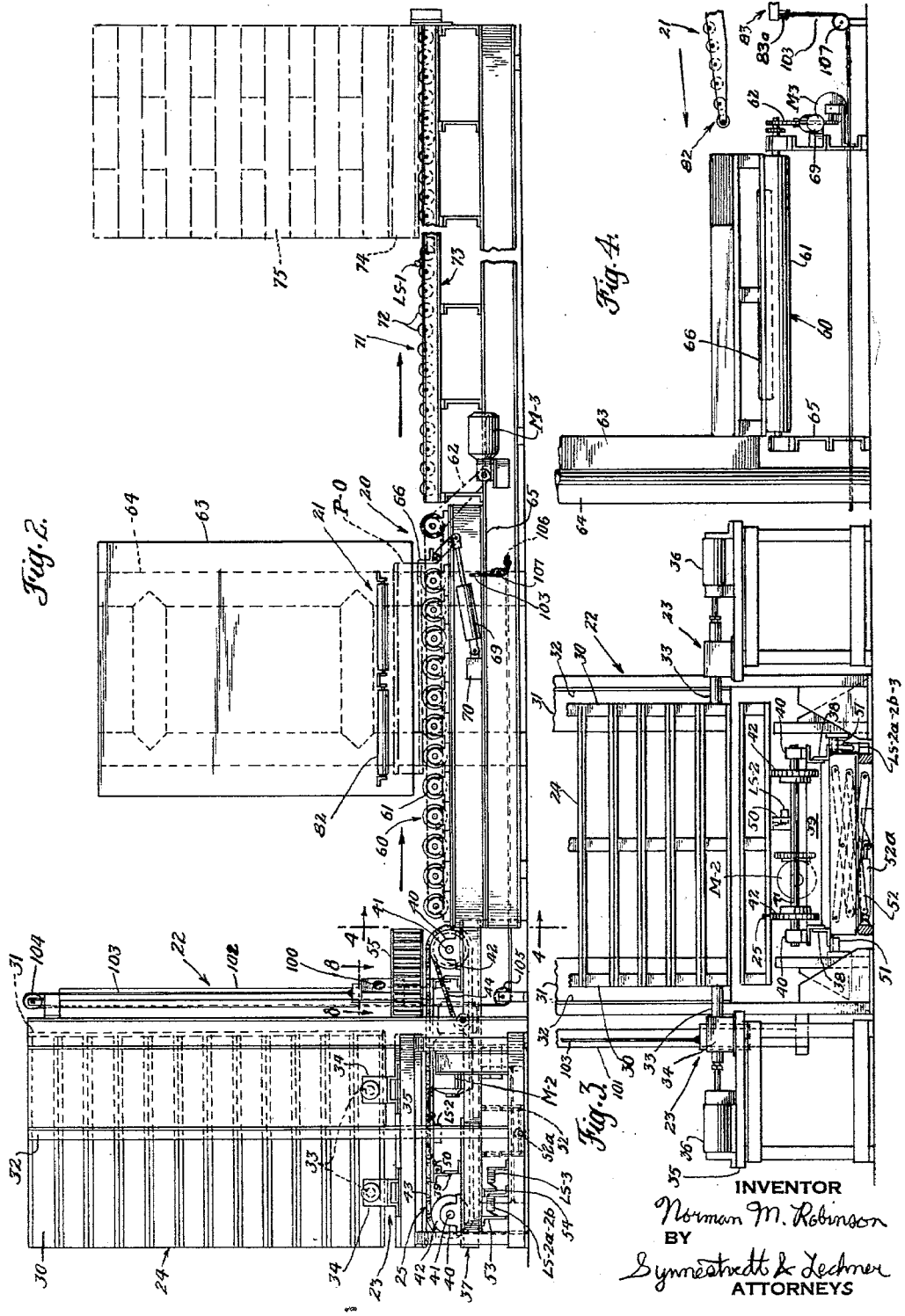

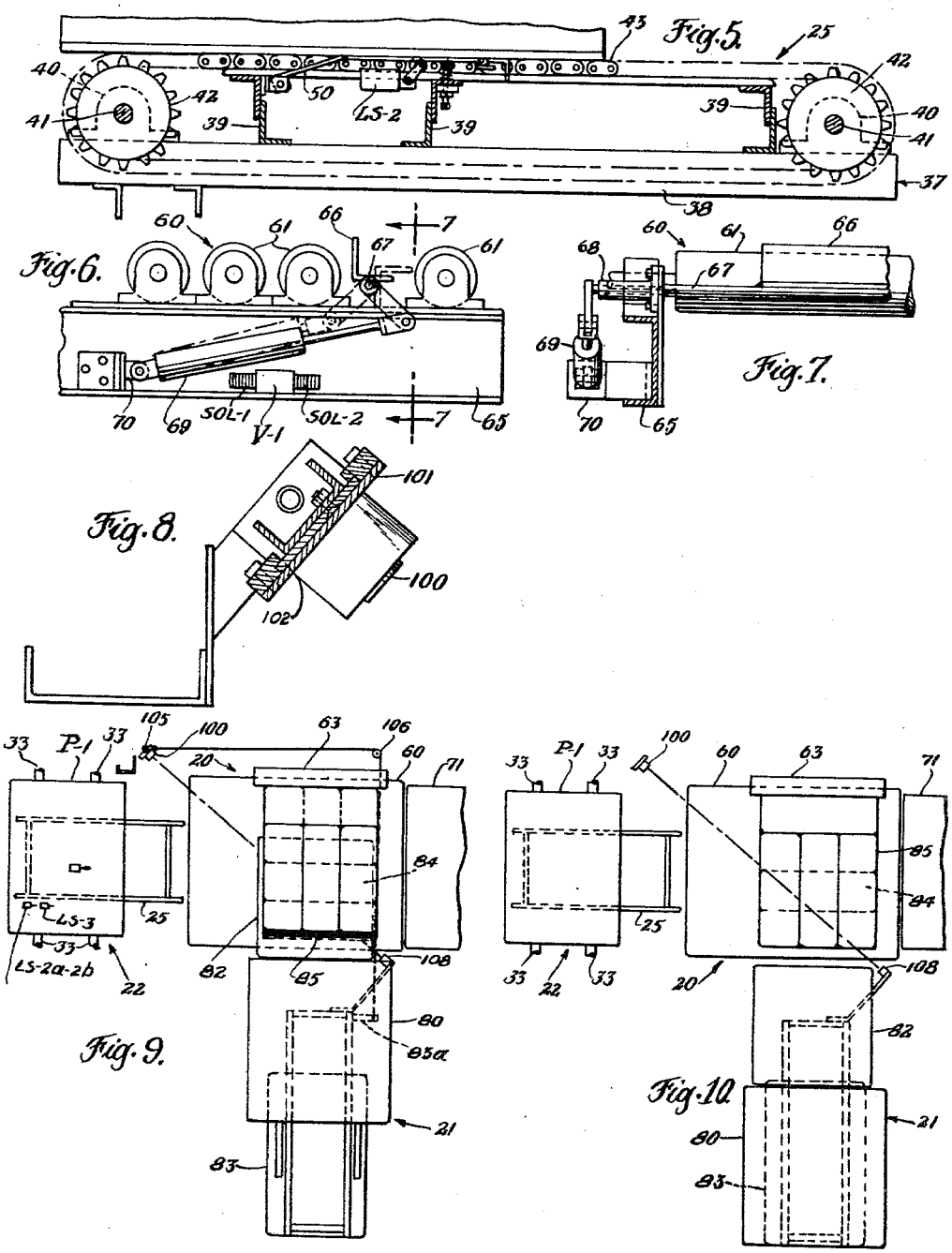

INVENTOR
Norman M. Robinson
BY
Synnestvedt & Lechner
ATTORNEYS

United States Patent Office 3,178,053
Patented Apr. 13, 1965

3,178,053
PALLET FEEDING APPARATUS
Norman M. Robinson, Coatesville, Pa., assignor to Certain-Teed Products Corporation, Ardmore, Pa., a corporation of Maryland
Filed Nov. 13, 1962, Ser. No. 236,873
3 Claims. (Cl. 221—9)

This invention relates to equipment for storing empty warehouse pallets and for feeding such pallets from storage to a loading station where packages are placed on them. It is particularly concerned with pallet feeding equipment of the type which is automatic in operation and suitable for use in conjunction with automatic machinery for loading packages onto the pallets.

It is common in modern warehousing practice to utilize small portable platforms, which are generally made of wood and are rectangular in shape, to provide a surface upon which to stack packages or other goods for storage and shipping. These small platforms, which are termed pallets, are usually constructed so that a pallet, together with the stack of packages on it, may be picked up and transported by a fork-lift truck. After use, an empty pallet is ordinarily returned to an area convenient to the loading facilities of the factory or warehouse for reuse.

Generally speaking, this invention is concerned with apparatus for storing empty pallets near the place of use or loading station, and for delivering to the loading station a pallet each time a requirement therefor arises in an automatic and trouble free fashion.

It is an object of this invention to provide power operated automatic pallet feeding equipment.

Another important object of this invention is to provide pallet feeding equipment in which the pallet being fed is automatically positioned and lined up at the loading station.

A further object of this invention is to provide pallet dispensing apparatus having a storage compartment which may be loaded by means of a fork-lift truck.

An object of this invention is the provision of pallet storage and feeding equipment in which pallets may be loaded into the storage compartment without interruption of the pallet feeding operation.

Another object of the invention is the provision of automatic pallet feeding equipment and a control system therefore which may be readily integrated with automatic pallet loading equipment to provide a substantially completely automatic loading system.

It is an important object of this invention to provide pallet feeding equipment which requires only a minimum of attention and which substantially eliminates material quantities of hand labor.

Other objects and purposes together with the above objects may be more readily understood by consideration of the detailed description which follows and the accompanying drawings in which:

FIGURE 1 is a plan view of pallet feeding equipment constructed in accordance with the invention;

FIGURE 2 is a front elevational view of the embodiment of FIGURE 1;

FIGURE 3 is a fragmentary end elevational view looking toward the right in FIGURE 2;

FIGURE 4 is a sectional view on the line 4—4 of FIGURE 2;

FIGURE 5 is an enlarged sectional view of a portion of the apparatus taken on the line 5—5 of FIGURE 1;

FIGURE 6 is an enlarged fragmentary elevational view of a retractable gate provided at the loading station;

FIGURE 7 is a sectional view on the line 7—7 of FIGURE 6;

FIGURE 8 is an enlarged plan section taken on the line 8—8 of FIGURE 2 illustrating a portion of the control equipment utilized in connection with the pallet feeding equipment and the pallet loading equipment;

FIGURE 9 is a diagrammatic plan view with certain of the parts shown in block diagram illustrating one step in the loading of a pallet at the loading station;

FIGURE 10 is a similar diagrammatic plan view showing another step in the pallet loading operation;

FIGURES 11 through 15 are diagrammatic elevational views illustrating sequentially various steps in the operation of feeding a pallet from a storage magazine to the loading station;

*General description*

Figure 16:
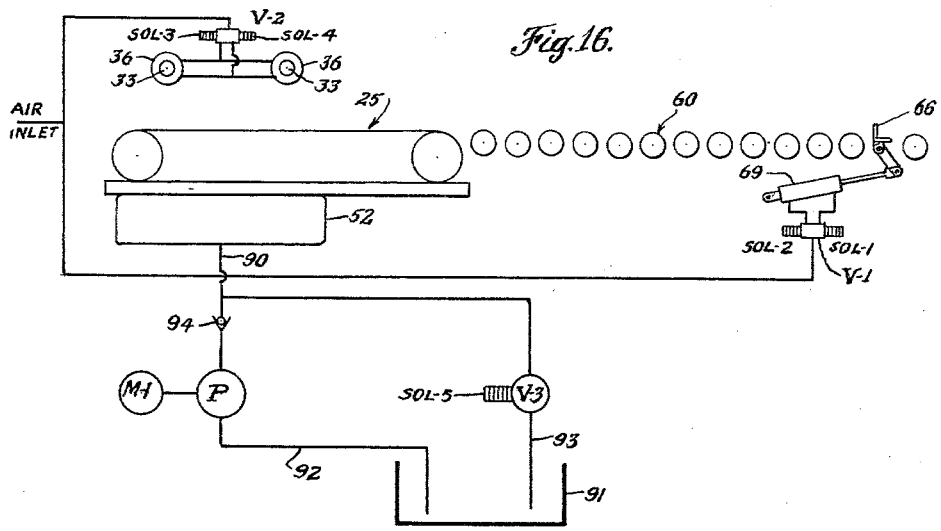
FIGURE 16 is a diagrammatic view illustrating the air system for certain parts which are pneumatically operated and the hydraulic system for certain parts which are hydraulically operated.

Before proceeding with a detailed description of the various components of the preferred embodiment, a brief description of the construction and operation of the invention will be given here for purposes of orientation. For this purpose reference is made first to FIGURE 1 where it can be seen that there is provided a loading station designated generally as 20, and pallet loading equipment designated generally as 21. To the left of the loading station is the pallet dispensing or feeding apparatus indicated generally at 22.

The feeding equipment includes clamping devices disposed on opposite sides of the feeder at 23. As can be seen in FIGURES 2 and 3, the clamping devices engage the bottom pallet of a stack comprising a plurality of pallets of the same size. In this way the entire stack is normally supported by means of the clamping devices. The stack of pallets is indicated in dotted outline on FIGURE 1 at 24.

Mounted below the stack 24 is a discharge conveyor designated generally as 25. This conveyor is arranged to move a pallet from a position generally beneath the stack to the roller bed forming part of the loading station 20. That is to say, the discharge conveyor discharges pallets to the right in FIGURE 1. The discharge conveyor 25 is also mounted for movement toward and away from the bottom of the stack. The importance of this feature may be more readily understood by a very brief consideration of the sequential operating diagrams of FIGURES 11 through 15. In FIGURE 11 the discharge conveyor 25 has on it a pallet P–1 and the stack 24 is supported by the clamps 33 engaging a pallet P–2. The discharge conveyor moves the pallet P–1 to the right. As can be seen in FIGURE 13, the empty conveyor is then elevated to the pallet P–2. The clamps 33 of the clamping devices 23 are then released and the full weight of the stack 24 is placed on the conveyor. The conveyor is then lowered as shown in FIGURE 14, until it has dropped a distance substantially equal to the thickness of a pallet. At this point the clamps 33 of the clamping devices 23 again move to support the stack by clamping pallet P–3 located immediately above pallet P–2. The conveyor 25 lowers further leaving the stack 24 supported by the clamps as shown in FIGURE 15 and carrying the pallet P–2 downwardly to a point where there is ample clearance between it and pallet P–3, thus placing pallet P–2 in readiness for discharge to the loading station. Note that the situation in FIGURES 11 and 15 is substantially the same except that the pallet stack 24 has one less pallet therein.

*Pallet storage and support*

It should first be pointed out that the preferred embodiments of the present invention are designed for use with pallets which are of substantially uniform size. Since certain portions of the apparatus are preferably proportioned and sized with respect to particular dimensions of the pallet, it will be useful to assign typical dimensions to a pallet for the purposes of this discussion. The equipment shown in the figures is designed for use with pallets which are about 36" long, 48" wide and 5" high. It should be remembered that pallets are usually rather crudely constructed from roughly finished lumber, so there is a certain amount of variation between pallets of the same nominal size.

As can best be seen in FIGURES 2 and 3, the pallet stack 24 is arranged so that the closed sides 30 of each of the pallets face toward the two oppositely disposed clamping devices 23. The open sides of the pallets, which can be seen in FIGURE 3, face generally at right angles to the clamping devices. The pallet stack 24 is positioned in a magazine formed by the magazine guides 31 positioned at the discharge side of the unit. Side walls 32 are also provided for the magazine, but, as can be seen in FIGURE 1, these side walls are preferably spaced away from the preferred position of the stack so that they do not normally contact a stack in the magazine. They are, however, positioned to prevent a stack from tipping over. The back of the magazine is most desirably left open since this materially facilitates loading the magazine in the following manner. When because of previous operations, the stack in the magazine has been reduced to a small number of pallets, a fork-lift truck is used to pick up a stack of pallets having their open ends all oriented in the same direction, by inserting the tines of the fork-lift into the open end of the bottom pallet of such a stack. This stack is carried by the fork-lift truck to the magazine. The truck approaches the magazine generally from the left in FIGURE 1 and deposits the new stack on top of the pallets already in the magazine. This reloading step can be accomplished without interrupting the normal operation of the pallet feeding device or of the loading equipment.

The stack 24 is normally supported by the clamping devices 23 which were mentioned briefly before. These clamping devices may best be understood by considering FIGURES 1 and 3. From these figures it can be seen that the pallet which is at the bottom of the stack at any given time is desirably clamped from both sides. In the preferred embodiment there are provided on each side two clamps 33 which may conveniently be cylindrical in shape. These clamps are mounted for reciprocation in journal blocks 34 which in turn are mounted on supporting tables 35. Each clamp is reciprocated by a pneumatic cylinder 36 which is also mounted on the table 35. The table may also conveniently carry control valves V–2 and solenoids SOL–3 and SOL–4 for said valves.

In order to assure that the stack of pallets is properly positioned with respect to the discharge conveyor and the roller bed, the pneumatic cylinders 36 are proportioned so that those operating the clamps 33 on one side of the stack develop sufficient force or thrust in the direction of the stack to move the clamps to the limit of their travel. Thus the clamps when they engage a pallet move it to the same position each time. This may be more fully understood by considering FIGURE 1 where it can be seen that the cylinders 36 at the top of that figure are larger than the opposing cylinders 36 at the bottom of the figure. Hence those at the top will develop greater force than those at the bottom. It has been found convenient to proportion the larger cylinders so that the force developed by them is approximately 50% more than the force developed by the smaller cylinders. This imbalance of force will cause the clamps operated by the top cylinders in FIGURE 1 to move toward the pallet with which they are engaged to the full limit of their travel. The clamps at the bottom of the figure, on the other hand, will move toward the pallet to engage it securely, but they will not, under ordinary circumstances, be able to overcome the superior force of the upper clamps to change the position of the pallet. In this manner the pallet held by the clamps and the remainder of the stack supported by that pallet will be reliably positioned above the discharge conveyor.

As will be explained later, the control equipment operates the pneumatic cylinders to urge the clamps toward and away from the stack at appropriate times.

Discharge conveyor

This portion of the equipment is shown to best advantage in FIGURES 1 through 3, and 5. In FIGURE 5 it can be seen that the conveyor is provided with a frame designated generally as 37 having longitudinal members 38 and cross members 39. At either end of the longitudinal frame members 38 are mounted journals 40 in which are mounted shafts 41 carrying sprocket wheels 42 which in turn carry the chains 43 of the conveyor. The conveyor chains are driven by the motor M–2 having a drive train 44 connected to the right hand shaft 41 as shown in FIGURE 1. Mounted on one of the cross bars 39 is an upwardly facing switch operator element 50 which, as can be seen in FIGURE 5, establishes a surface at about the same level as that occupied by the upper run of the conveyor chains 43. Beneath the switch operator 50 is mounted switch LS–2, whose function will be discussed later herein.

The entire discharge conveyor discussed thus far is mounted for generally vertical elevation. In FIGURE 3 it is shown in its lower position with the longitudinal frame members 38 seated against mechanical stops 51. Elevating mechanism in the form of a scissors lift 52 operated by a hydraulic cylinder 52a is mounted beneath the discharge conveyor in a position to lift it upwardly toward the stack 24 and at other times to lower it away from the stack.

In FIGURES 1 and 2 there are shown two additional pieces of control equipment whose function will be discussed later. These are limit switches LS–2a–2b and LS–3. As can best be seen on FIGURE 2 both of these switches are mounted below the conveyor on the fixed frame of the elevating mechanism.

Switch operators 53 and 54 are carried on the elevatable portion of the discharge conveyor and thus move into and out of contact with the switches as the discharge conveyor is raised and lowered.

A set of vertically mounted guide rollers 55 are desirably provided adjacent the discharge conveyor to provide additional assurance that pallets being transferred from the discharge conveyor 25 to the loading station 20 are properly positioned. As was explained above the principal positioning and alignment of the pallets is performed by the clamping mechanism.

Loading station

The loading station 20 is of course of great importance in the operation of the loading equipment 21, and in a sense forms a portion of that equipment. However, certain features of the loading station are intimately related to and form a part of the present invention. By way of illustration it can be pointed out that the loading station arranged according to this invention may be used with several different types of loading equipment, among which is that shown in copending application Serial No. 785,259, filed January 6, 1959, now Patent No. 3,128,889, assigned to the same assignee. It may also be used with hand loading equipment if desired.

The loading station 20 includes a power driven roller bed 60 having rollers 61 driven by motor M–3 through a drive train 62 in a direction to urge pallets on the roller bed to the right in FIGURES 1 and 2 as shown by the arrows. Positioned at one side of the roller bed but across from the loading equipment 21 is a backstop 63. The backstop is mounted on a frame 64 of rather substantial construction since packages being placed on a pallet by the loading equipment 21 will be thrust against it with some force in many cases.

The roller bed is supported on a frame 65 at a level so that the top of the rollers is approximately at the same height as the top of the chains of the discharge conveyor 25. A restraining gate 66 is mounted between two of the rollers 61 in a position to be moved into and out of the path of a pallet moving across the roller bed. The gate is so positioned on the roller bed that when it is in the up position it will engage and halt a pallet such as that shown in dotted lines as P-0 on FIGURES 1 and 2 at the proper location with respect to the loading equipment, to receive packages therefrom. The construction of the gate is shown in full detail in FIGURES 6 and 7. From these figures it can be seen that the gate is mounted on a shaft 67 which is pivotally journalled in the bearing 68 at either end. The shaft is rotated by the pneumatic cylinder 69, one end of which is pivotally mounted on a bracket 70 attached to the frame 65. The gate is shown in full lines in FIGURE 6 in the up position with the piston rod of cylinder 69 extended and in dotted lines in down position with the piston rod of cylinder 69 withdrawn. It can be seen that in the down position the gate presents no obstacle to the movement of a pallet along the surface of the roller bed. The pneumatic cylinder 69 is provided with a control valve V-1 operated by solenoids SOL-1 and SOL-2.

It should be noted that the roller bed preferably extends from a location immediately adjacent the discharge conveyor on the left in FIGURES 1 and 2 to a position beyond gate 66, or, stated alternately, beyond the loading position of a pallet such as P-0, on the right in those figures.

Another piece of equipment included in the loading station is the take-away conveyor designated generally as 71. This conveyor may conveniently comprise a series of rollers 72 mounted in three parallel rows as shown in FIGURE 1 on a frame designated generally as 73. This conveyor is tilted slightly downwardly to the right in FIGURES 1 and 2 to provide for gravity transport of a loaded pallet such as 74 containing packages 75. A control switch LS-1, whose function will be discussed later, is mounted on the take-away conveyor 71 in a position to be operated by a loaded pallet passing over it. LS-1 is best positioned a distance to the right of gate 66 in FIGURE 1 somewhat greater than the length of a pallet (36" for the pallets considered here). The reasons for this will become clear when the operation of the invention is discussed in detail.

While a full understanding of the operation of loading equipment which is preferably used in connection with this invention may be gained from copending application Serial No. 785,259 referred to above, the diagrammatic illustrations of FIGURES 9 and 10 will provide a general understanding of this equipment and its relation to the subject matter of the present invention. In these figures, the roller bed 60, the backstop 63, the take-away conveyor 71, discharge conveyor 25, and pallet P-1 held by clamps 33 are all shown in block outline.

The loading equipment is partially shown in FIGURE 1 and is also shown in block outline in FIGURES 9 and 10. Turning first to FIGURE 1, it can be seen that there is provided a conveyor 80 arranged to move packages shown in dotted outline in that figure at 81 toward the backstop 63 of the loading station. The conveyor 80 deposits the packages on a sloping ramp 82 attached to it at one end and the packages slide down this ramp and onto a pallet like P-0 at the loading station or onto packages already forming a layer on such a pallet. Turning now to FIGURES 9 and 10 for an understanding of the remainder of the loading equipment, it can be seen that the conveyor 80 is mounted for reciprocation toward and away from the loading station on a base 83. It is also mounted on base 83 for elevation.

With the above brief description of the loading equipment in hand, its operation may be outlined with reference to FIGURES 9 and 10. In FIGURE 9, a layer consisting of several packages is shown already deposited on a pallet at the loading station at 84. The conveyor 80 is reciprocated toward the backstop 63 and a second layer of packages 85 moves from the conveyor 80 down the sloping ramp 82 and onto the layer of packages 84 at the loading station. After the second layer 85 has moved down the sloping ramp, the conveyor 80 and ramp 82 are reciprocated away from the loading station to a position like that shown in FIGURE 10. In that figure, deposition of the layer 85 on top of the layer 84 (which is in turn on a pallet) is shown completed. In order to deposit another layer on top of layer 85, the conveyor 80 and its sloping ramp 82 are elevated on the base 83 to the correct height for the deposition of another layer.

Hydraulic system and air system

A portion of the power operated equipment described thus far is desirably driven by means of hydraulic and pneumatic systems. These systems are shown very diagrammatically in FIGURE 16 and the operation of these systems will be described later herein after the electrical control equipment has been explained.

In FIGURE 16, the discharge conveyor 25 and the roller bed 60 are shown very diagrammatically as are the clamps 33 and the cylinders 36 for said clamps. In addition, the hydraulic mechanism 52 of the elevating mechanism for the discharge conveyor 25 is shown as a simple block beneath the conveyor. FIGURE 16 also shows in outline form the gate 66 and its pneumatic cylinder 69.

Compressed air is provided from a source which is indicated but not shown at the left of the figure. One line leads air to the valve V-2 (which is actually a pair of valves, one for the clamps on each side of the magazine) which valve V-2 has control solenoids SOL-3 and SOL-4 for operating the valve to alternately advance and retract the clamps 33 by means of the cylinders 36. Another air line leads to the valve V-1 which operates the cylinder 69 to move the gate 66 up and down at appropriate times. Valve V-1 itself is operated by solenoids SOL-1 and SOL-2.

A single hydraulic line 90 is connected to elevating cylinder 52a. The line 90 is connected with the hydraulic reservoir 91 by two lines 92 and 93. Line 92 is a feed line having in it a pump marked P driven by motor M-1. A check valve 94 is positioned in the line between the pump and the junction of lines 92 and 93. Line 93 is a return line having mounted in it valve V-3 which is normally closed and which is opened at appropriate times by solenoid SOL-5.

When the operation of the feeding equipment requires that the discharge conveyor 25 be elevated, motor M-1 is started and hydraulic fluid is pumped from the reservoir 91 through lines 92 and 90 to the elevating mechanism 52. During this operation fluid can not return to the reservoir 91 because valve V-3 is closed. When it is necessary to halt the discharge conveyor 25 in an elevated position, motor M-1 is turned off. Hydraulic fluid can not leak back into the reservoir through the line 92 because it is prevented from doing so by check valve 94. In addition, fluid can not return to the reservoir through line 93 because valve V-3 is closed.

When the operation requires lowering of the conveyor 25, solenoid SOL-5 is energized to open valve V-3, whereupon fluid drains from the elevating mechanism 52 to the reservoir 91 through lines 90 and 93. In order to stop the descent of the conveyor at an intermediate point, valve V-3 need only be closed. Resumption of the descent is accomplished by reopening valve V-3.

Electrical control equipment

Various items of control equipment have been identified and discussed briefly heretofore in connection with the description of the structural portions of the preferred embodiment. Other parts of the control system will be discussed here, and in addition, the general arrangement of the control equipment into a system for use with the preferred embodiment will be outlined with special reference to FIGURE 17.

Attention should first be turned to FIGURES 1, 2 and 8. In those figures it can be seen that a photocell 100 is mounted on the pallet feeding equipment in such a way that the photocell "looks" generally across the loading station toward the loading equipment. The photocell is mounted on a runner 101 which moves on a vertical rail 102 as shown to best advantage in FIGURE 2. The photocell and its runner are hung from a cable 103 which runs along the rail 102 over a pulley 104 at the top of the rail and then downwardly behind the rail to pulleys 105, 106, and 107, which serve to carry the cable from the vicinity of the photocell, under the loading table, to the elevating mechanism on base 83 of the pallet loading apparatus. This end of the cable is attached to a bracket 83a of the loading apparatus which moves upwardly (but does not reciprocate) as succeeding layers of packages are deposited on a pallet at the loading station. The path followed by the cable 103 may be seen in fragments in FIGURES 1, 2, and 4, but the full path is shown to best advantage in the diagrammatic view of FIGURE 9.

A light source 108 is mounted on the same elevatable portion of the loading equipment 21 as cable 103, and in such a position that it is aimed at photocell 100. This can be seen most clearly in FIGURE 10.

The foregoing arrangement of the photocell and the light source and the cable interconnecting them causes the photocell to be elevated each time the conveyor 80 of the loading equipment is elevated. In addition, the photocell is raised the same distance as the light source each time so they remain in optical alignment.

The general operation of the photocell control equipment may be understood by considering FIGURES 9 and 10. In FIGURE 9, the light beam between the source 108 and the cell 100 is interrupted by the layer of packages being deposited at the loading station by the loading equipment. After deposition of a layer, the conveyor and ramp of the loading equipment are reciprocated away from the loading station as was explained before. However, the light beam remains interrupted by the newly deposited layer of packages at the loading station. Interruption of the light beam during the time interval after withdrawal of the conveyor 80 and the ramp 82 sends a signal to equipment controlling the elevation of the loading equipment. The control equipment initiates elevation of the conveyor 80 until the light source and photocell have been raised far enough to allow reestablishment of the light beam between them as shown in FIGURE 10. Reestablishment of the light beam causes a signal to be transmitted from the photocell to the control equipment for the elevator of the loading equipment, and this control equipment stops the elevation of the conveyor 80. The conveyor 80 and its ramp 82 are in this manner brought to the proper altitude for the deposition of the next layer of packages at the loading station.

From the above, it can be seen that the light beam is established once and interrupted once for each layer of packages deposited on the pallet P-0 at the loading station. Either the interruption or the reestablishment of the light beam may be utilized to generate a signal to operate a stepping switch which will be discussed later herein. In this manner operation of the control equipment for the pallet feeder and for the equipment which clears the loading station of the loaded pallet can be initiated at the proper time.

Figure 17:
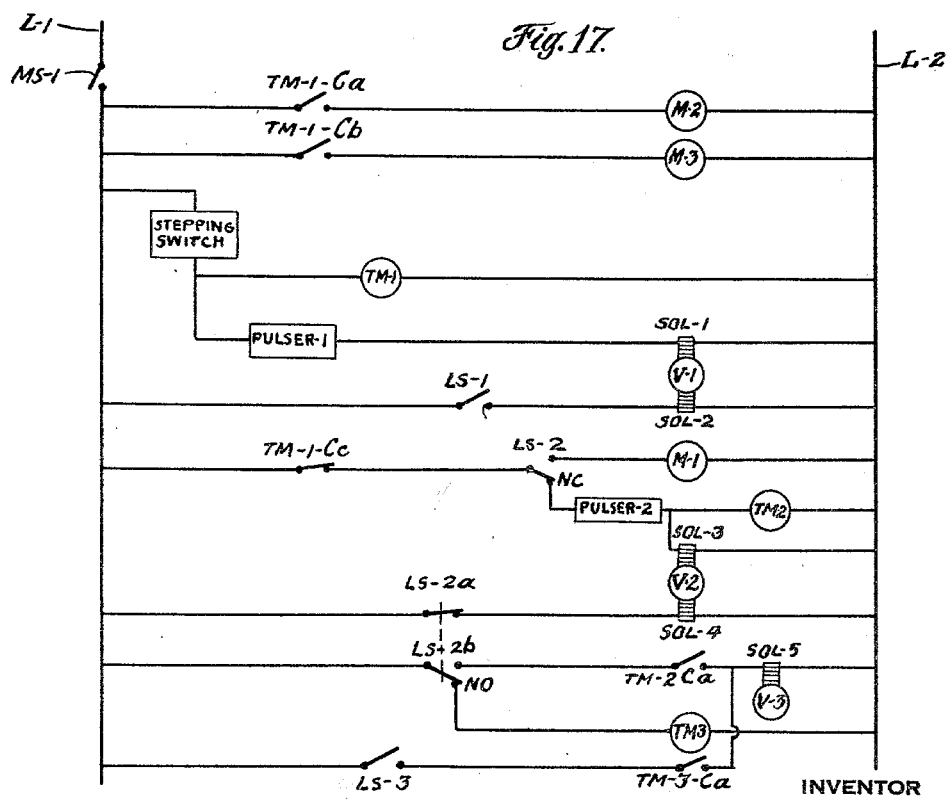
FIGURE 17 is a simplified wiring diagram showing a control system for the embodiment of FIGURE 1.

Attention is now directed to the simplified wiring diagram of FIGURE 17. A.C. power is provided through lines L-1 and L-2 and a master switch MS-1 is provided in one of the lines for on-off control. The major items of control equipment shown diagrammatically on this figure include motor M-2, which is the drive motor for the discharge conveyor 25 (see FIGURE 1), motor M-3, which is the drive motor for the roller bed 60 of the loading station (see FIGURE 1), and motor M-1, which drives pump P of the elevating apparatus for the discharge conveyor (see FIGURE 16). Also included are air valves V-1 operated by solenoids SOL-1, SOL-2, for the air operated gate 66, and V-2 operated by solenoids SOL-3 and SOL-4, for the air operated clamping devices 33. Hydraulic valve V-3 operated by solenoid SOL-5 is located on the return line of the hydraulic elevating system.

*Unified description of controlled operation*

With the above outline of the control systems in hand, it is now possible to summarize the operating sequence of the preferred embodiment with special reference to the sequential diagrams of FIGURES 11 through 15 and the diagrams of FIGURES 16 and 17.

FIGURE 11 shows the equipment in what may be termed its starting position. In that position discharge conveyor 25 is in its lowered or unelevated position and carries one pallet P-1 in a position for feed to the loading station. Clamps 33 indicated by cross hatched circles hold a stack 24 above the discharge conveyor by engaging pallet P-2. Pallet P-0 is at the loading station and has been loaded with a full stack of packages. It should be noted that pallet P-0 is positioned against gate 66 which is in the up position.

The starting position is reflected in FIGURES 16 and 17. Considering the air system of FIGURE 16 first, valve V-2 is set to supply air pressure to clamps 33. Valve V-1 is set to supply air pressure to cylinder 69 to hold gate 66 in the up position. Valve V-3 of the hydraulic system is closed and pump P is not operating.

Turning now to FIGURE 17, at the starting position motors M-2 and M-3 are off and none of the solenoids are energized. Limit switch LS-1 located on the gravity take-away conveyor 71 is open. Limit switch LS-2 is in its down or N.C. position, being held there by pallet P-1. Note, however, that position N.C. of LS-2 operates through pulser 2 so that at the starting position no signal passes through LS-2. Switch LS-2a-2b has two operating elements. As can be seen on FIGURE 11, this switch is positioned on the framework beneath the discharge conveyor 25. In the starting position, LS-2a is closed. LS-2b is in the down or N.O. position, but timer TM-3 is in its timed-out condition. LS-3 which is also positioned beneath discharge conveyor 25 is in the open position. Master switch 1 is closed.

As was mentioned before, the stepping switch is stepped one position by the photocell circuit each time a layer is deposited on a pallet. In the example shown in FIGURE 11, every sixth step of the switch will coincide with the completion of a pallet loading operation, and thus indicate that a situation substantially like FIGURE 11 exists. This step of the stepping switch starts timer TM-1 which immediately closes and holds closed two contacts. Timer contact TM-1-Ca starts motor M-2 and similarly timer contact TM-1-Cb starts motor M-3. At the same time the stepping switch sends a signal to pulser 1 which is a device of a well known type designed to convert a sustained signal into a short interval pulse. The pulse issuing from the pulser 1 energizes solenoid SOL-1 to operate valve V-1, thus lowering the gate.

Thus far the control equipment has created the situation illustrated diagrammatically in FIGURE 12. Gate 66 is lowered and pallet P-0 is moved to the right over it by motor M-3 which drives the roller bed 60. Pallet P-1 is also moved to the right by motor M-2 and it is thus passed onto the roller bed where it continues moving to the right under the influence of motor M-3. Note that movement of pallet P-1 off conveyor 25 allows LS-2 to move from its down or N.C. position to its up position.

Pallet P-0 with its load moves along the take-away conveyor to the right until it contacts LS-1 closing that switch. Closure of LS-1 in this manner energizes solenoid SOL-2 to reset valve V-1 and raise gate 66. The position of the loaded pallet as it contacts LS-1 is shown in dotted lines. The loaded pallet P-0 continues to move to the right along the take-away conveyor to the end thereof where it is shown in dotted outline. After it passes over LS-1, that switch resumes its open position but the gate 66 is unaffected thereby.

During the above events timer TM-1 has not yet timed out and therefore motor M-2 and M-3 continue to operate. M-3 urges newly arrived pallet P-1 to the right on the roller bed through the first position shown in dotted outline to the second position shown in dotted outline against the gate. After pallet P-1 has arrived at the gate, motor M-3 continues to operate for a short period in order to force P-1 against the gate securely and insure that this pallet is "squared up" in the proper position to receive packages from the loading equipment. Timer TM-1 then times out, opening internal contacts TM-1-Ca and TM-1-Cb thus stopping motors M-2 and M-3.

When timer TM-1 times out it closes normally open contact TM-1-Cc thus delivering a voltage to LS-2. As pointed out before, LS-2 is in its up position and the voltage is delivered through it to motor M-1 which drives pump P. Pump P delivers hydraulic fluid to the elevating mechanism 52 (see FIGURE 16) and conveyor 25 begins to rise toward pallet P-2.

The discharge conveyor continues to rise until it reaches the position shown in FIGURE 13. When it reaches this position, switch LS-2 is returned to its down or N.C. position. It will be noted that during the elevation of conveyor 25, LS-2a is moved to its open position and LS-2b is moved to its closed position. Returning now to LS-2, the movement of that switch to its down position sends a signal to pulser 2 which in turn sends a pulse to start timer TM-2 and to operate SOL-3 on valve V-2. Operation of valve V-2 withdraws clamps 33 from pallet P-2. In FIGURE 13 the withdrawn clamps are indicated by open circles. Thus it can be seen that the entire weight of stack 24 is now supported on the conveyor 25. Timer TM-2 times out and in doing so closes internal contact TM-2-Ca. This completes a circuit through switch LS-2b, which, it will be remembered, is closed and operates solenoid SOL-5 on hydraulic valve V-3 to open it. Hydraulic fluid is thus allowed to drain from the elevating mechanism 52 to the reservoir 91 (see FIGURE 16). Conveyor 25 therefore starts to move downwardly.

When the conveyor has moved downwardly a distance substantially equal to the thickness of one pallet (5"), switch LS-2a is operated to energize solenoid SOL-4, thus operating valve V-2 which reengages clamps 33 with stack 24. However, since the stack has been lowered, in the manner just described, approximately one pallet thickness, the clamps engage pallet P-3 instead of pallet P-2. At the same time that LS-2a is operated, switch LS-2b is moved to its down or N.O. position. This movement breaks the circuit energizing SOL-5 on hydraulic valve V-3, thus allowing it to close. Closure of this valve stops the downward movement of the conveyor. It is preferred that such a stoppage be brought about in order to allow ample time for clamps 33 to move into engagement with pallet P-3.

Movement of LS-2b to the down or N.O. position starts timer TM-3 which closes internal contacts TM-3-Ca. LS-3 it will be remembered, is closed, and therefore a voltage is delivered through LS-3 and TM-3-Ca to solenoid SOL-5 which reopens valve V-3. The conveyor 25 resumes its downward movement until it is halted by the mechanical stops at the same time that switch LS-3 is opened by operator 54, thus deenergizing SOL-5 and allowing valve V-3 to close. Timer TM-3 ultimately times out. In this manner the situation illustrated in FIGURE 15 is brought about. In this figure as in FIGURE 11 the conveyor is in its down position holding a pallet P-2 ready for feeding a spaced distance below stack 24 which is held by clamps 33 engaging pallet P-3. The apparatus is thus ready to go through another operating cycle.

I claim:

1. Equipment for delivering empty pallets to a position for receiving loads, comprising pallet storage means for holding a plurality of pallets piled in a stack, power operated discharge means positioned below said stack arranged to remove a pallet from the bottom of the stack and to discharge it generally laterally, a power driven conveyor positioned adjacent said discharge means and extending away therefrom for receiving the discharged pallets, a backstop positioned beside said conveyor, and establishing, with a portion of said conveyor, a loading station, a power operated displaceable gate movable into and out of a pallet restraining position at the end of the loading station remote from said discharge means, sensing means at a point beyond said gate for detecting the presence of a loaded pallet, said sensing means being interconnected with said gate to cause movement of the gate into its pallet restraining position, power means for said conveyor, and control means for turning said conveyor power means off at a preselected time after said gate moves to its restraining position in response to said sensing means.

2. Equipment for delivering empty pallets to a pallet loading station comprising storage means for holding a plurality of pallets piled in a stack, clamping means adapted to engage the bottom pallet of said stack and thereby to support the stack, a conveyor under the stack adapted to deliver pallets to said loading station, said conveyor being mounted upon elevator means capable of up and down movement toward and away from the stack, control means for effecting upward movement of the elevator means to bring the conveyor into supporting contact with the bottom pallet of said stack, means releasing the clamping means when the conveyor is in supporting contact with the stack, additional control means for effecting lowering of the elevator means to drop the stack a distance equal to the thickness of a pallet, third control means actuated by the elevator means when the stack is so dropped to bring the clamping means into engagement with the pallet next above the bottom pallet thereby releasing the bottom pallet from the stack, said clamping means being constructed and arranged to move the pallet to a position of desired alignment at one side of the conveyor, and a fourth control means actuation of which is initiated when the clamping means engages the pallet next above the bottom pallet for further lowering the elevator means to move the conveyor with said released and aligned pallet thereon to a position where the pallet may be delivered by the conveyor to the loading station.

3. Equipment according to claim 2 wherein the clamping and aligning means include power means at each side of the stack one of which exerts a force greater than the other whereby to secure the said desired alignment.

References Cited by the Examiner

UNITED STATES PATENTS

| 2,701,650 | 2/55 | Stevenson | 221—290 XR |
| 2,769,570 | 11/56 | Adams | 221—11 XR |
| 2,814,397 | 11/57 | Connell | 221—11 XR |
| 2,858,043 | 10/58 | Fenton et al. | 221—9 |
| 2,940,636 | 6/60 | Pechy | 221—104 |
| 3,038,615 | 6/62 | Roth et al. | 214—8.5 |
| 3,074,595 | 1/63 | Boller | 221—221 |

LOUIS J. DEMBO, *Primary Examiner.*

KENNETH N. LEIMER, *Examiner.*